(12) United States Patent
Hovis et al.

(10) Patent No.: US 6,451,173 B1
(45) Date of Patent: Sep. 17, 2002

(54) SEPARATOR SYSTEM

(75) Inventors: Keith W. Hovis; Richard L. Anderson, both of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/476,305

(22) Filed: Dec. 30, 1999

(51) Int. Cl.[7] ............................. B01D 3/32; B01D 3/42
(52) U.S. Cl. ..................... 203/1; 202/181; 202/204; 202/158; 203/100; 203/DIG. 18; 210/265; 210/269; 210/294; 502/21; 502/36; 502/56
(58) Field of Search ........................ 202/158, 181, 202/204, 193, 196; 261/113, 114.5; 137/391, 393; 203/100, 1, DIG. 18; 210/265, 269, 294; 502/20, 22, 36, 56, 21

(56) References Cited

U.S. PATENT DOCUMENTS

| | | | |
|---|---|---|---|
| 3,922,326 A | * 11/1975 | Yoshida et al. | 261/113 |
| 3,975,164 A | 8/1976 | Brown, Jr. | 23/288 H |
| 4,919,257 A | * 4/1990 | Brigham, Sr. et al. | 202/158 |
| 5,034,103 A | * 7/1991 | Hamer et al. | 202/158 |
| 5,154,835 A | 10/1992 | DeMichael | 210/744 |
| 5,237,122 A | 8/1993 | Eastman et al. | 585/709 |
| 5,326,436 A | * 7/1994 | Sampath | 261/114.1 |
| 5,387,322 A | * 2/1995 | Cialkowski et al. | 202/234 |
| 5,547,909 A | 8/1996 | Carlson | 502/20 |
| 5,972,171 A | * 10/1999 | Ross et al. | 261/114.5 |
| 6,193,849 B1 | * 2/2001 | Lockett, Jr. | 203/2 |

* cited by examiner

*Primary Examiner*—Virginia Manoharan
(74) *Attorney, Agent, or Firm*—Jeffrey R. Anderson

(57) ABSTRACT

An improved apparatus useful in a process for separating a liquid stream (which can be an HF catalyst mixture) having a first liquid component (which can be HF), a second liquid component (which can be light ASO) and a third liquid component (which can be heavy ASO) is disclosed. The apparatus includes a closed vessel including an upper portion, a lower portion, and an intermediate portion, and above a bottom tray contained therein having a downcomer extending downwardly therefrom. The apparatus also includes a conduit located within the downcomer and opening below the level of the bottom tray.

11 Claims, 2 Drawing Sheets

SEPARATOR SYSTEM

The present invention relates to systems and processes for separating liquids of different densities. More specifically, the invention relates to a process and system for regenerating a liquid catalyst mixture utilized in the alkylation of olefin hydrocarbons by isoparaffin hydrocarbons.

BACKGROUND OF THE INVENTION

The process of separating liquids in a separator having fractionation trays is well known in the art. One problem that can arise from the use of such a separator for separating liquids is the accumulation, and trapping, of an upper liquid phase above a lower liquid phase in the bottom of the separator. The upper liquid phase can become hydraulically trapped in the downcomer of the bottom tray, and/or trapped above the lower liquid phase in the bottom of the separator. This can cause flooding of the lower fractionation trays as the upper liquid phase backs up out of the downcomer and onto the lower fractionation trays, which detrimentally affects the separator operation.

A specific example of this is in the regeneration of a liquid catalyst mixture comprising hydrofluoric acid (HF), light acid soluble oil (ASO) and heavy ASO utilized in the alkylation of olefin hydrocarbons by isoparaffin hydrocarbons. The catalyst mixture is typically charged to a regeneration column, having fractionation trays, to contact an upwardly moving isoparaffin stream which strips HF out of the catalyst mixture for removal overhead. The remaining catalyst mixture accumulates in the bottom of the column wherein it separates into an upper phase (light ASO) above a lower phase (heavy ASO). The heavy ASO is removed out of the bottom of the column, but, the light ASO can become hydraulically trapped above the lower phase in the bottom of the separator and/or in the downcomer of the bottom fractionation tray. As the light ASO accumulates, the lower fractionation trays can flood, causing less efficient regeneration of the catalyst mixture. Thus, it is desirable to have a method and system for separating liquids, and more particularly, regenerating an alkylation unit catalyst mixture, in a more efficient manner and without flooding of the separator.

SUMMARY OF THE INVENTION

It is an object of the present invention to provide a system to be used in the separation of liquids in a more efficient manner.

It is a further object of the present invention to provide a method of separating liquids in a more efficient manner.

It is another object of the present invention to provide a method of separating liquids in a more efficient manner which includes a control system for controlling the level of an upper phase liquid forming in the bottom of the separator, above a lower phase liquid, to avert flooding of the separator with the upper phase liquid.

It is yet another object of the present invention to improve HF alkylation unit catalyst regeneration column operations.

In accordance with a first embodiment of the present invention, the separator includes:

a closed vessel having an inside wall, an upper portion, a lower portion, and an intermediate portion disposed between the lower portion and the upper portion, the lower portion of the closed vessel having an opening in the inside wall;

at least one fractionation tray disposed within the intermediate portion of the closed vessel, the at least one fractionation tray including a bottom tray having an upper surface;

a first conduit extending through and downwardly from the bottom tray into the lower portion of the closed vessel and connecting the lower portion of the closed vessel and the intermediate portion of the closed vessel in fluid flow communication, the first conduit having a longitudinal axis, an inner surface, an open top end spatially located above the upper surface of the bottom tray, an open bottom end spatially located below the bottom tray and an opening in the inner surface intermediate the open top end and the open bottom end; and a second conduit having a longitudinal axis, an open first end, an open second end spatially located below the open first end, and an outside surface, the open first end of the second conduit disposed within the first conduit, wherein the open first end of the second conduit opens generally in the direction of and below the open top end of the first conduit, the open second end of the second conduit extends through the opening in the inner surface of the first conduit and the open second end of the second conduit further extends through the opening in the inside wall of the lower portion of the closed vessel, the outside surface of the open second end of the second conduit being in sealing engagement with the opening in the inner surface of the first conduit, and the outside surface of the open second end of the second conduit being in sealing engagement with the opening in the inside wall of the lower portion of the closed vessel.

In accordance with a second embodiment of the present invention, the separator described in the first embodiment further comprises:

a third conduit operably related to the intermediate portion of the closed vessel;

a fourth conduit operably related to the upper portion of the closed vessel; and a fifth conduit operably related to the lower portion of the closed vessel.

In accordance with a third embodiment of the present invention, the separator described in the second embodiment further comprises:

a sixth conduit operably related to the lower portion of the closed vessel.

In accordance with a fourth embodiment of the present invention, a preferred method of operating the separator described above in the second embodiment includes:

introducing an inlet liquid stream comprising a first liquid component, a second liquid component and a third liquid component into the intermediate portion of the closed vessel and above the bottom tray via the third conduit;

withdrawing at least a portion of the first liquid component from the upper portion of the closed vessel via the fourth conduit;

accumulating at least a portion of the second liquid component and at least a portion of the third liquid component in the lower portion of the closed vessel;

allowing the at least a portion of the second liquid component and the at least a portion of the third liquid component to undergo a gravity phase separation to thereby produce a top phase comprising the at least a portion of the second liquid component and a bottom phase comprising the at least a portion of the third liquid component;

withdrawing at least a portion of the top phase from the lower portion of the closed vessel via the second conduit; and withdrawing at least a portion of the bottom phase from the lower portion of the closed vessel via the fifth conduit.

In accordance with a fifth embodiment of the present invention, a preferred method of operating the separator described in the third embodiment includes:

introducing an HF catalyst into the intermediate portion of the closed vessel and above the bottom tray through the third conduit;

introducing a vaporous isoparaffin stripping fluid into the lower portion of the closed vessel and below the bottom tray through the sixth conduit;

withdrawing an overhead stream comprising HF and the vaporous isoparaffin stripping fluid from the upper portion of the closed vessel through the fourth conduit;

accumulating the light ASO and the heavy ASO in the lower portion of the closed vessel;

allowing the light ASO and the heavy ASO to undergo a gravity phase separation, in the lower portion of the closed vessel, to thereby produce a top phase comprising the light ASO and a bottom phase comprising the heavy ASO;

withdrawing at least a portion of the top phase from the lower portion of the closed vessel through the second conduit; and withdrawing at least a portion of the bottom phase from the lower portion of the closed vessel through the fifth conduit.

In accordance with a sixth embodiment of the present invention, the process and/or system of the present invention as described in the fifth embodiment further comprises a control system for indirectly maintaining the level of liquid in the first conduit at or near a predetermined level.

Other objects and advantages of the invention will be apparent from the detailed description of the invention and the appended claims.

DETAILED DESCRIPTION OF THE INVENTION

The system and process of the present invention will be described with reference to the drawings. Reference to the specific configurations of the drawings is not meant to limit the invention to the details of the drawings disclosed in conjunction therewith.

Figure 1:
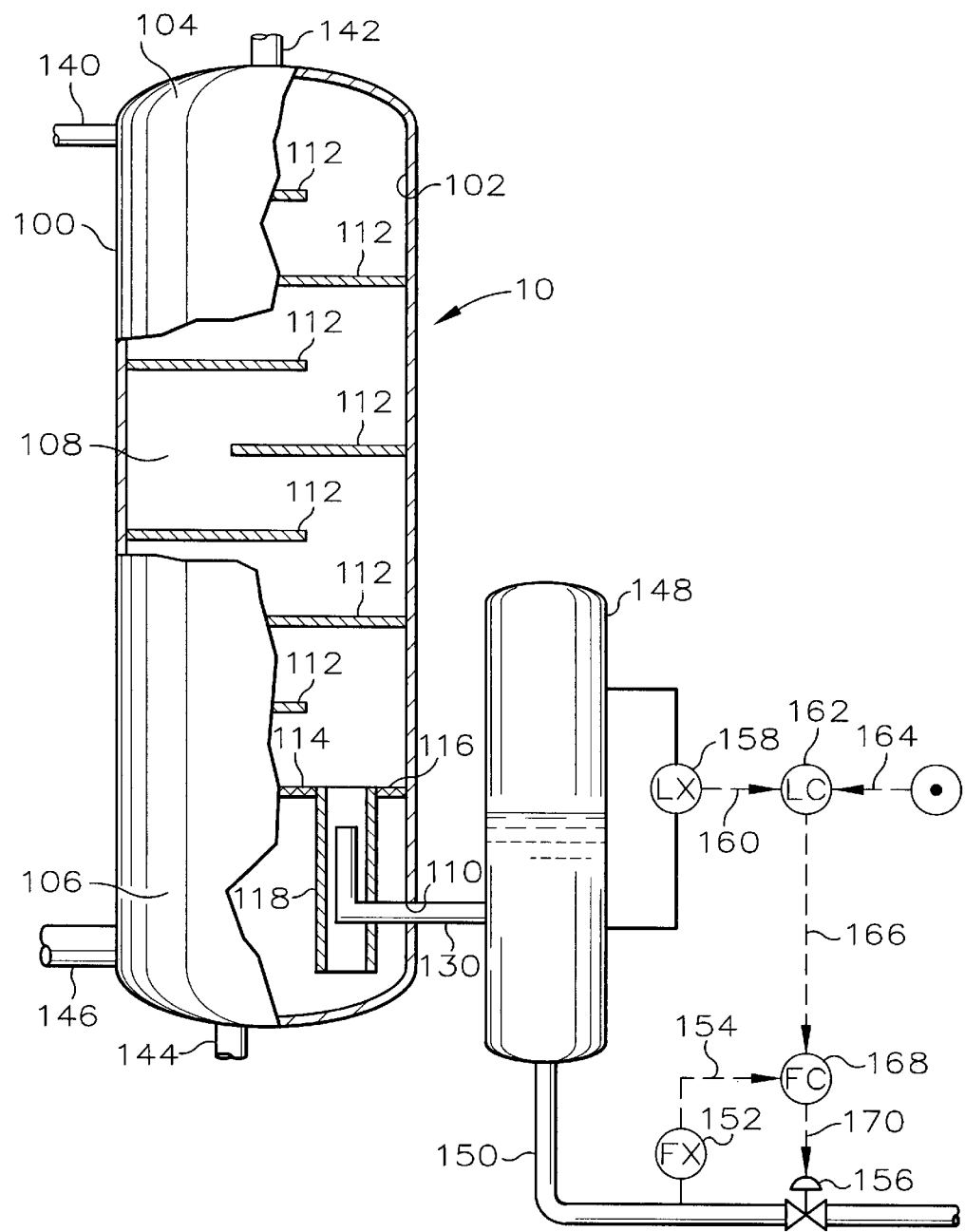
FIG. 1 is a partially cut-away elevation of a separator constructed in accordance with the present invention.
Figure 2:
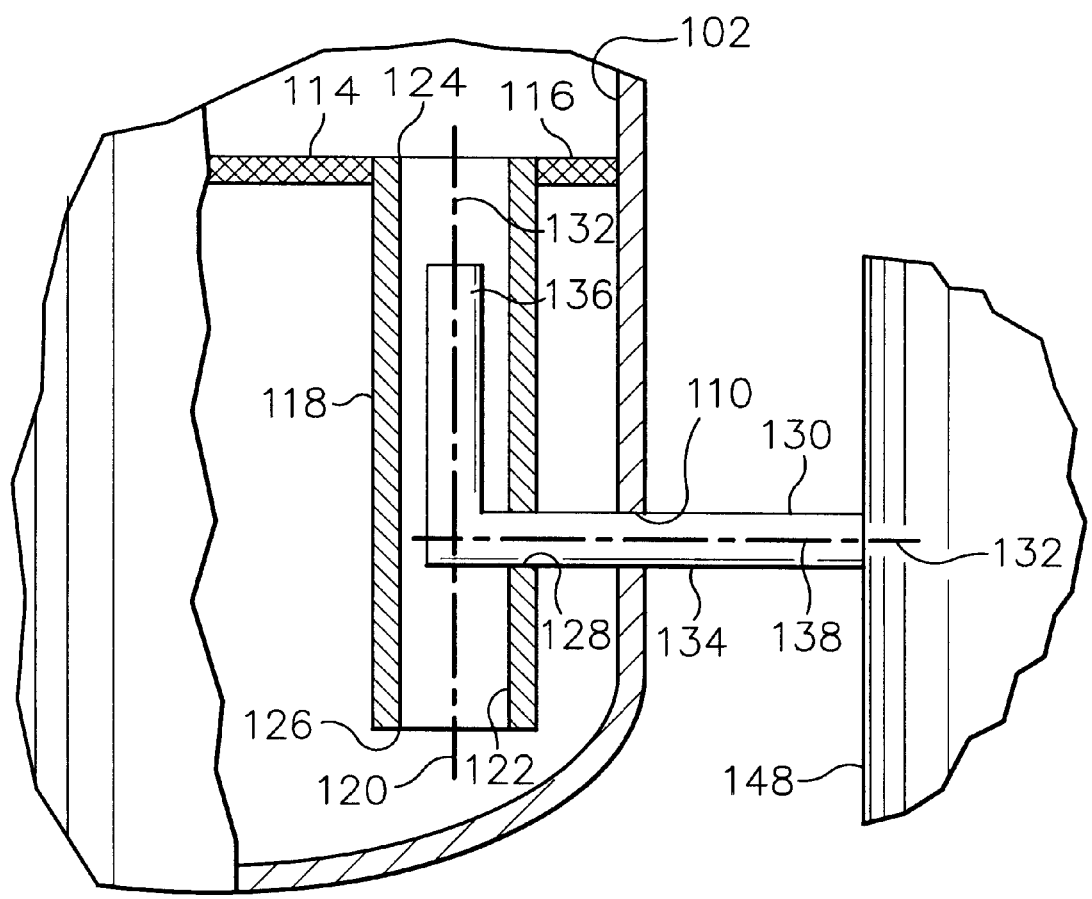
FIG. 2 is an enlarged partial view showing in greater detail certain features of the separator shown in FIG. 1.

Regarding the first embodiment of the present invention, and referring to FIGS. 1 and 2, therein is illustrated the inventive separator 10 including an upright, closed vessel 100 having an inside wall 102, an upper portion 104, a lower portion 106 and an intermediate portion 108 disposed between the lower portion 106 and the upper portion 104. The lower portion 106 of the closed vessel 100 has an opening 110 in the inside wall 102. The intermediate portion 108 includes at least one fractionation tray 112, including a bottom tray 114, disposed within intermediate portion 108. The bottom tray 114 has an upper surface 116.

Separator 10 further includes a first conduit 118 which extends through and downwardly from bottom tray 114 and into lower portion 106, and is preferably in sealing engagement with bottom tray 114. First conduit 118 connects intermediate portion 108 with lower portion 106 in fluid flow communication. First conduit 118 has a longitudinal axis 120 (which is generally vertical), an inner surface 122, an open top end 124 spatially located at or slightly above the level of upper surface 116 of bottom tray 114, an open bottom end 126 spatially located below bottom tray 114, and an opening 128 in inner surface 122 which is intermediate to open top end 124 and open bottom end 126.

Separator 10 further includes a second conduit 130 having a longitudinal axis 132, an outside surface 134, an open first end 136 disposed within first conduit 118 and opening generally in the direction of and below open top end 124 of first conduit 118, and an open second end 138 spatially located below open first end 136. Open second end 138 of second conduit 130 extends through opening 128 in inner surface 122 of first conduit 118 and extends through opening 110 in inside wall 102 of closed vessel 100. Outside surface 134 of second conduit 130 is preferably in sealing engagement with opening 128 in inner surface 122 of first conduit 118, and outside surface 134 of second conduit 130 is also preferably in sealing engagement with opening 110 in inside wall 102 of closed vessel 100. Preferably, at least a portion of the longitudinal axis 132 of second conduit 130 is in a generally parallel relation to the longitudinal axis 120 of first conduit 118. Also, preferably, at least a portion of the longitudinal axis 132 of second conduit 130 is in a generally perpendicular relation to the longitudinal axis 120 of first conduit 118.

In accordance with a second embodiment of the present invention, and referring to FIG. 1, separator 10 is further characterized to include a third conduit 140 which is operably related by connection in fluid flow communication to the interior of the intermediate portion 108 of closed vessel 100, a fourth conduit 142 which is operably related by connection in fluid flow communication to the interior of the upper portion 104 of closed vessel 100, and a fifth conduit 144 which is operably related by connection in fluid flow communication to the interior of the lower portion 106 of closed vessel 100.

In accordance with a third embodiment of the present invention, and referring to FIG. 1, separator 10 is even further characterized to include a sixth conduit 146 which is operably related by connection in fluid flow communication to the interior of the lower portion 106 of closed vessel 100.

In accordance with a fourth embodiment of the present invention, and referring to FIG. 1 and the operation of the separator 10 as described in the second embodiment, an inlet liquid stream comprising, consisting of, or consisting essentially of a first liquid component, a second liquid component, and a third liquid component is introduced into the intermediate portion 108 of closed vessel 100, and above bottom tray 114, via third conduit 140. Generally, the third liquid component has a higher density than the second liquid component. At least a portion of the first liquid component is removed as a vapor from upper portion 104 of closed vessel 100 via fourth conduit 142.

At least a portion of the second liquid component and at least a portion of the third liquid component are accumulated in the lower portion 106 of closed vessel 100 and allowed to undergo a gravity phase separation to thereby produce a top phase comprising at least a portion of the second liquid component and a bottom phase comprising at least a portion of the third liquid component.

At least a portion of the top phase is withdrawn from lower portion 106 of closed vessel 100 via second conduit 130. At least a portion of the bottom phase is withdrawn from lower portion 106 of closed vessel 100 via fifth conduit 144.

Preferably, separator 10 is operated such that the second liquid component accumulated in lower portion 106 of closed vessel 100 is substantially prevented from passing out of first conduit 118 and into the intermediate portion 108 of closed vessel 100.

In accordance with a fifth embodiment of the present invention, and referring to FIG. 1 and the operation of the separator 10, an HF catalyst mixture comprising hydrofluoric acid (HF), light acid soluble oil (ASO), and heavy ASO, typically from an olefin and isoparaffin alkylation process, is introduced into the intermediate portion 108 of closed vessel 100, and above bottom tray 114, via third conduit 140.

Generally, the heavy ASO has a higher density than the light ASO. A vaporous isoparaffin stripping fluid is introduced into the lower portion 106 of closed vessel 100, and below bottom tray 114, via sixth conduit 146. The isoparaffin is preferably isobutane. At least a portion of the HF and at least a portion of the vaporous isoparaffin stripping fluid are withdrawn as an overhead vapor stream from upper portion 104 of closed vessel 100 via fourth conduit 142.

At least a portion of the light ASO and at least a portion of the heavy ASO are accumulated in the lower portion 106 of closed vessel 100 and allowed to undergo a phase separation to thereby produce a top phase comprising at least a portion of the light ASO and a bottom phase comprising at least a portion of the heavy ASO.

At least a portion of the top phase is withdrawn from lower portion 106 of closed vessel 100 via second conduit 130. At least a portion of the bottom phase is withdrawn from lower portion 106 of closed vessel 100 via fifth conduit 144.

Preferably, separator 10 is operated such that the light ASO accumulated in lower portion 106 of closed vessel 100 is substantially prevented from passing out of first conduit 118 and into the intermediate portion 108 of closed vessel 100.

In accordance with a sixth embodiment of the present invention, the inventive process or system 10 described in the fifth embodiment can include a control system operably related to second conduit 130 which provides control means for indirectly maintaining the level of liquid in first conduit 118 at or near a predetermined level.

Dash lines, which designate signal lines in the drawings, are electrical or pneumatic in this preferred embodiment. However, the invention is also applicable to mechanical, hydraulic, or other signal means for transmitting information. In almost all control systems some combination of these types of signals will be used. However, the use of any other type of signal transmission, compatible with the process and equipment in use, is within the scope of the invention.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired liquid level and an actual liquid level are compared by a controller. The output could be a signal representative of a desired change in the flow rate of some liquid necessary to make the desired and actual liquid levels equal. If the controller output can range from 0 to 10 volts and/or 4–20 milliamps, which is typical, then the output signal could be scaled so that an output signal having a voltage level of 5.0 volts or an amperage level of 12 milliamps, respectively, corresponds to 50 percent of some specified flow rate.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of two or more such equipment types. While the presently preferred embodiment of the invention preferably utilizes a combination of pneumatic final control elements in conjunction with electrical analog signal handling and translation apparatus, the system and method of the invention can be implemented using a variety of specific equipment available to and understood by those skilled in the process control art.

Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring again to FIG. 1, the control system comprises a secondary vessel 148 the interior of which is operably related by connection in fluid flow communication to second conduit 130, a seventh conduit 150 operably related by connection in fluid flow communication to the interior of the lower portion of the secondary vessel 148, a flow transducer 152 operably related to seventh conduit 150 which produces a flow rate signal, for transmission via signal line 154, which is representative of the flow rate of the liquid material carried through seventh conduit 150, a control valve 156 operably related to and interposed in seventh conduit 150 which provides means for adjusting the flow rate of the liquid material carried in seventh conduit 150, a liquid level transducer 158 operably associated with secondary vessel 148 and providing means for measuring the liquid level in secondary vessel 148 and producing a liquid level signal, for transmission via signal line 160, representative of the actual liquid level in secondary vessel 148, a liquid level controller 162 receiving a liquid level signal via signal line 160 and an operator-entered signal, for transmission via signal line 164, which is representative of the desired value for the liquid level in secondary vessel 148. The desired liquid level in secondary vessel 148 is such as to ensure the liquid level in the first conduit 118 is at or below the bottom tray 114. Liquid level controller 162 establishes a first output signal, for transmission via signal line 166, responsive to the difference between the liquid level signal transmitted via signal line 160 and the operator-entered signal transmitted via signal line 164, the first output signal transmitted via signal line 166 is scaled to be representative of the flow rate of the liquid material carried in seventh conduit 150 required to maintain the actual liquid level in secondary vessel 148 represented by the liquid level signal transmitted via signal line 160 substantially equal to the desired liquid level represented by the operator-entered signal transmitted vie signal line 164.

The first output signal transmitted via signal line 166 is provided as a set point input via signal line 166 to flow controller 168. Also provided as a process variable input to flow controller 168 is the flow rate signal transmitted via signal line 154 which is representative of the actual flow rate of the liquid material carried in seventh conduit 150. Flow controller 168 provides a second output signal, for transmission via signal line 170, which is responsive to the difference between the flow rate signal transmitted via signal line 154 and the first output signal transmitted via signal line 166. The second output signal transmitted via signal line 170 is scaled to be representative of the position of control valve 156 required to maintain the actual flow rate represented by the flow rate signal transmitted via signal line 154 substantially equal to the desired flow rate represented by the first output signal transmitted via signal line 166.

Reasonable variations, modifications, and adaptations can be made within the scope of the disclosure and the appended claims without departing from the scope of this invention.

That which is claimed is:

1. A separator comprising:
    a closed vessel having an inside wall, an upper portion, a lower portion, and an intermediate portion disposed between the lower portion and the upper portion, said lower portion of said closed vessel having an opening in said inside wall;
    at least one fractionation tray disposed within said intermediate portion of said vessel, said at least one fractionation tray including a bottom tray having an upper surface;
    a first conduit extending through and downwardly from said bottom tray into said lower portion of said closed vessel and connecting said lower portion of said closed vessel and said intermediate portion of said closed vessel in fluid flow communication, said first conduit having a longitudinal axis, an inner surface, an open top end spatially located above the upper surface of said bottom tray, an open bottom end spatially located below said bottom tray and an opening in said inner surface intermediate said open top end and said open bottom end; and
    a second conduit having a longitudinal axis, an open first end, an open second end spatially located below said open first end, and an outside surface, said open first end of said second conduit disposed within said first conduit, wherein said open first end of said second conduit opens generally in the direction of and below said open top end of said first conduit, said open second end of said second conduit extends through said opening in said inner surface of said first conduit and said open second end of said second conduit further extends through said opening in said inside wall of said lower portion of said closed vessel, said outside surface of said open second end of said second conduit being in sealing engagement with said opening in said inner surface of said first conduit, and said outside surface of said open second end of said second conduit being in sealing engagement with said opening in said inside wall of said lower portion of said closed vessel.

2. A separator in accordance with claim 1 further comprising:
    a third conduit operably related to said intermediate portion of said closed vessel;
    a fourth conduit operably related to said upper portion of said closed vessel; and
    a fifth outlet conduit operably related, as an outlet, to said lower portion of said closed vessel.

3. A separator in accordance with claim 2 further comprising:
    a sixth inlet conduit operably related, as an inlet, to said lower portion of said closed vessel.

4. A separator in accordance with claim 3 further comprising a control system comprising:
    a secondary vessel operably related to said second conduit;
    a seventh conduit operably related to said secondary vessel;
    a flow transducer operably related to said seventh conduit which produces a flow rate signal representative of the flow rate of the material carried in said seventh conduit;
    a level transducer operably associated with said secondary vessel which provides means for measuring the level in said secondary vessel and which also produces a liquid level signal representative of the actual liquid level in said secondary vessel;
    a liquid level controller which receives said liquid level signal and an operator entered signal, which is representative of the desired value for the liquid level in said secondary vessel, said liquid level controller establishes a first output signal responsive to said liquid level signal and said operator entered signal, said first output signal is scaled to be representative of the flow rate of the material carried in said seventh conduit required to maintain the actual liquid level in said secondary vessel represented by said liquid level signal substantially equal to the desired value for the liquid level in said secondary vessel represented by said operator entered signal;
    a flow controller which receives said first output signal and said flow rate signal, said flow controller establishes a second output signal responsive to said first output signal and said flow rate signal; and
    a control valve operably located in said seventh conduit for adjusting the flow rate of the material carried in said seventh conduit in response to said second output signal.

5. A separator in accordance with claim 2 further comprising a control system comprising:
    a secondary vessel operably related to said second conduit;
    a seventh conduit operably related to said secondary vessel;
    a flow transducer operably related to said seventh conduit which produces a flow rate signal representative of the flow rate of material carried in said seventh conduit;

a level transducer operably associated with said secondary vessel which provides means for measuring the level in said secondary vessel and which also produces a liquid level signal representative of the actual liquid level in said secondary vessel;

a liquid level controller which receives said liquid level signal and an operator entered signal, which is representative of the desired value for the liquid level in said secondary vessel, said liquid level controller establishes a first output signal responsive to said liquid level signal and said operator entered signal, said first output signal is scaled to be representative of the flow rate of the material carried in said seventh conduit required to maintain the actual liquid level in said secondary vessel represented by said liquid level signal substantially equal to the desired value for the liquid level in said secondary vessel represented by said operator entered signal;

a flow controller which receives said first output signal and said flow rate signal, said flow controller establishes a second output signal responsive to said first output signal and said flow rate signal; and a control valve operably located in said seventh conduit for adjusting the flow rate of the material carried in said seventh conduit in response to said second output signal.

6. A separator in accordance with claim 1 wherein at least a portion of the longitudinal axis of said open first end of said second conduit is in a generally parallel relation to the longitudinal axis of said first conduit.

7. A separator in accordance with claim 1 wherein at least a portion of the longitudinal axis of said open second end of said second conduit is in a generally perpendicular relation to the longitudinal axis of said first conduit.

8. A process for separating three liquid components of a liquid stream comprising:

using a separator comprising:
a closed vessel having an inside wall, an upper portion, a lower portion, and an intermediate portion disposed between the lower portion and the upper portion, said lower portion of said closed vessel having an opening in said inside wall;

at least one fractionation tray disposed within said intermediate portion of said vessel, said at least one fractionation tray including a bottom tray having an upper surface;

a first conduit extending through and downwardly from said bottom tray into said lower portion of said closed vessel and connecting said lower portion of said closed vessel and said intermediate portion of said closed vessel in fluid flow communication, said first conduit having a longitudinal axis, an inner surface, an open top end spatially located above the upper surface of said bottom tray, an open bottom end spatially located below said bottom tray and an opening in said inner surface intermediate said open top end and said open bottom end; and a second conduit having a longitudinal axis, an open first end, an open second end spatially located below said open first end, and an outside surface, said open first end of said second conduit disposed within said first conduit, wherein said open first end of said second conduit opens generally in the direction of and below said open top end of said first conduit, said open second end of said second conduit extends through said opening in said inner surface of said first conduit and said open second end of said second conduit further extends through said opening in said inside wall of said lower portion of said closed vessel, said outside surface of said open second end of said second conduit being in sealing engagement with said opening in said inner surface of said first conduit, and said outside surface of said open second end of said second conduit being in sealing engagement with said opening in said inside wall of said lower portion of said closed vessel;

a third conduit operably related to said intermediate portion of said closed vessel;

a fourth conduit operably related to said upper portion of said closed vessel; and a fifth conduit operably related to said lower portion of said closed vessel;

introducing an inlet liquid stream comprising a first liquid component, a second liquid component and a third liquid component into said intermediate portion of said closed vessel and above said bottom tray via said third conduit;

withdrawing at least a portion of said first liquid component from said upper portion of said closed vessel via said fourth conduit;

accumulating at least a portion of said second liquid component and at least a portion of said third liquid component in said lower portion of said closed vessel;

allowing said at least a portion of said second liquid component and said at least a portion of said third liquid component to undergo a gravity phase separation to thereby produce a top phase comprising said at least a portion of said second liquid component and a bottom phase comprising said at least a portion of said third liquid component;

withdrawing at least a portion of said top phase from said lower portion of said closed vessel via said second conduit, and withdrawing at least a portion of said bottom phase from said lower portion of said closed vessel via said fifth conduit.

9. A process in accordance with claim 8 wherein said separator is operated such that said at least a portion of said second liquid component accumulated in said lower portion of said closed vessel is substantially prevented from passing out of said first conduit and into said intermediate portion of said closed vessel.

10. A process for regenerating an HF catalyst mixture comprising HF, light Acid Soluble Oil (ASO), and heavy ASO, used in an olefin and isoparaffin alkylation process, comprising:

using a separator comprising:
a closed vessel having an inside wall, an upper portion, a lower portion, and an intermediate portion disposed between the lower portion and the upper portion, said lower portion of said closed vessel having an opening in said inside wall;

at least one fractionation tray disposed within said intermediate portion of said vessel, said at least one fractionation tray including a bottom tray having an upper surface;

a first conduit extending through and downwardly from said bottom tray into said lower portion of said closed vessel and connecting said lower portion of said closed vessel and said intermediate portion of said closed vessel in fluid flow communication, said first conduit having a longitudinal axis, an inner surface, an open top end spatially located above the upper surface of said bottom tray, an open bottom end spatially located below said bottom tray and an opening in said inner surface intermediate said open top end and said open bottom end; and a second conduit having a longitudinal axis, an open first end, an open second end spatially located below said open first end, and an outside surface, said open first end of said second conduit disposed within said first conduit, wherein said open first end of said second conduit opens generally in the direction of and below said open top end of said first conduit, said open second end of said second conduit extends through said opening in said inner surface of said first conduit and said open second end of said second conduit further extends through said opening in said inside wall of said lower portion of said closed vessel, said outside surface of said open second end of said second conduit being in sealing engagement with said opening in said inner surface of said first conduit, and said outside surface of said open second end of said second conduit being in sealing engagement with said opening in said inside wall of said lower portion of said closed vessel;

a third conduit operably related to said intermediate portion of said closed vessel;

a fourth conduit operably related to said upper portion of said closed vessel;

a fifth conduit operably related to said lower portion of said closed vessel; and a sixth conduit operably related to said lower portion of said closed vessel;

introducing said HF catalyst mixture into said intermediate portion of said closed vessel and above said bottom tray through said third conduit;

introducing a vaporous isoparaffin stripping fluid into said lower portion of said closed vessel and below said bottom tray through said sixth conduit;

withdrawing an overhead stream comprising HF and said vaporous isoparaffin stripping fluid from said upper portion of said closed vessel via said fourth conduit;

accumulating said light ASO and said heavy ASO in said lower portion of said closed vessel;

allowing said light ASO and said heavy ASO to undergo a gravity phase separation, in said lower portion of said closed vessel, to thereby produce a top phase comprising said light ASO and a bottom phase comprising said heavy ASO;

withdrawing at least a portion of said top phase from said lower portion of said closed vessel through said second conduit; and withdrawing at least a portion of said bottom phase from said lower portion of said closed vessel through said fifth conduit.

11. A process in accordance with claim 10 wherein said separator is operated such that said light ASO accumulated in said lower portion is substantially prevented from passing out of said first conduit and into said intermediate portion of said closed vessel.

* * * * *